A. EKERN AND R. A. TANNER.
PORTABLE MILKING MACHINE.
APPLICATION FILED JAN. 12, 1920.
1,377,244.
Patented May 10, 1921.
3 SHEETS—SHEET 2.
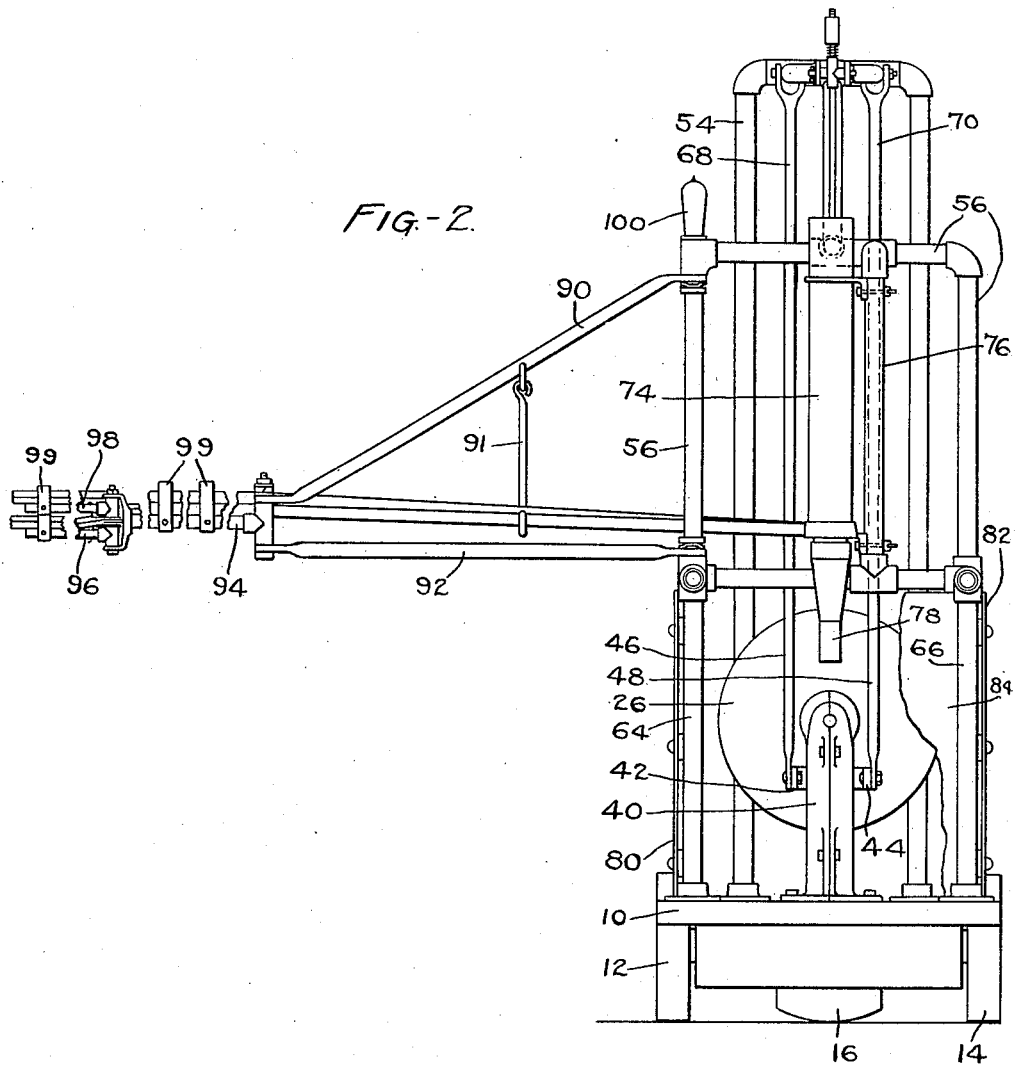
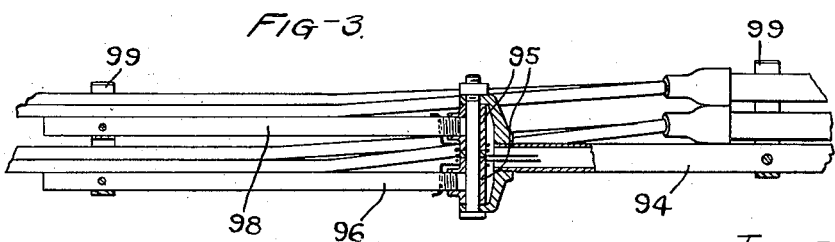
INVENTORS.
ALFRED EKERN.
RUDOLF A. TANNER.
By Whiteley and Ruckman
ATTORNEYS.

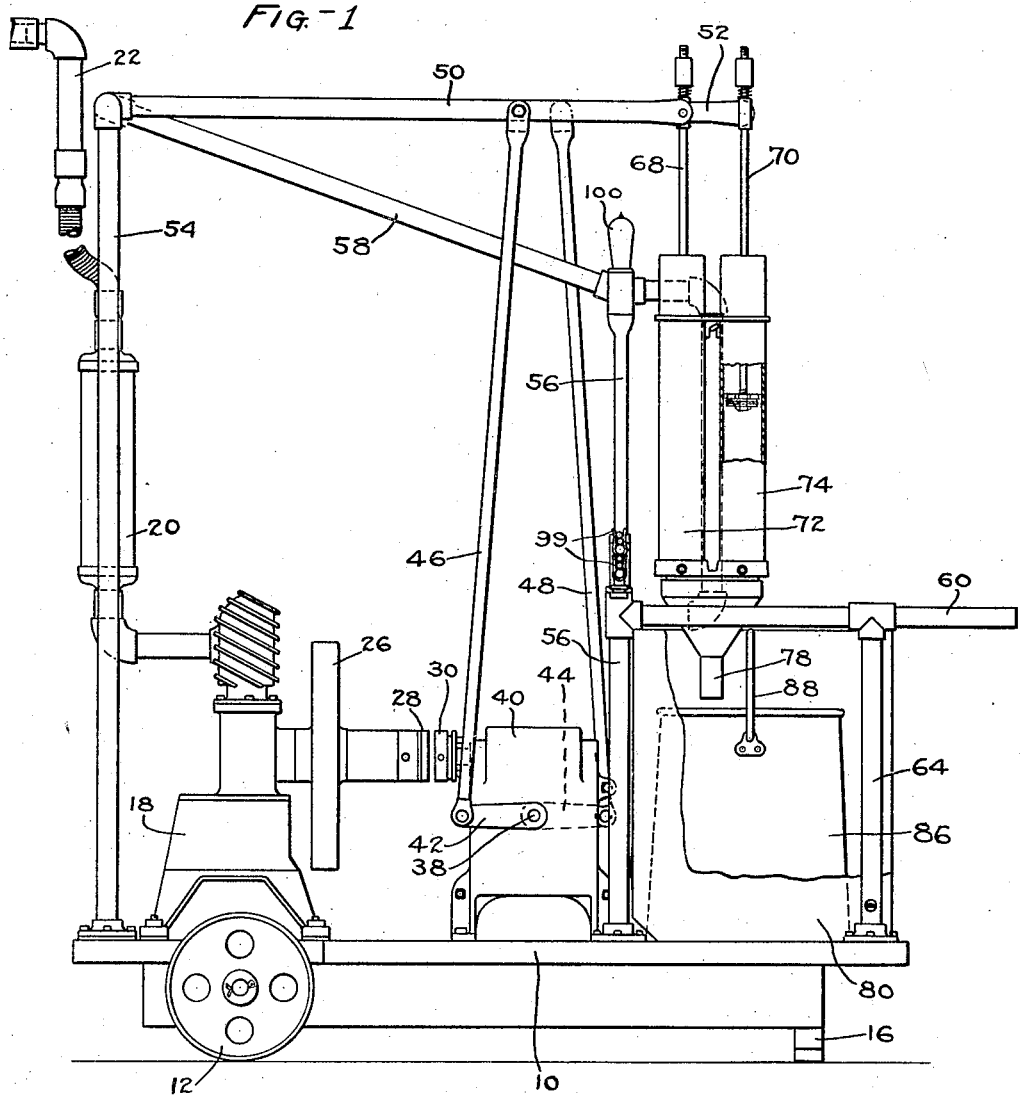

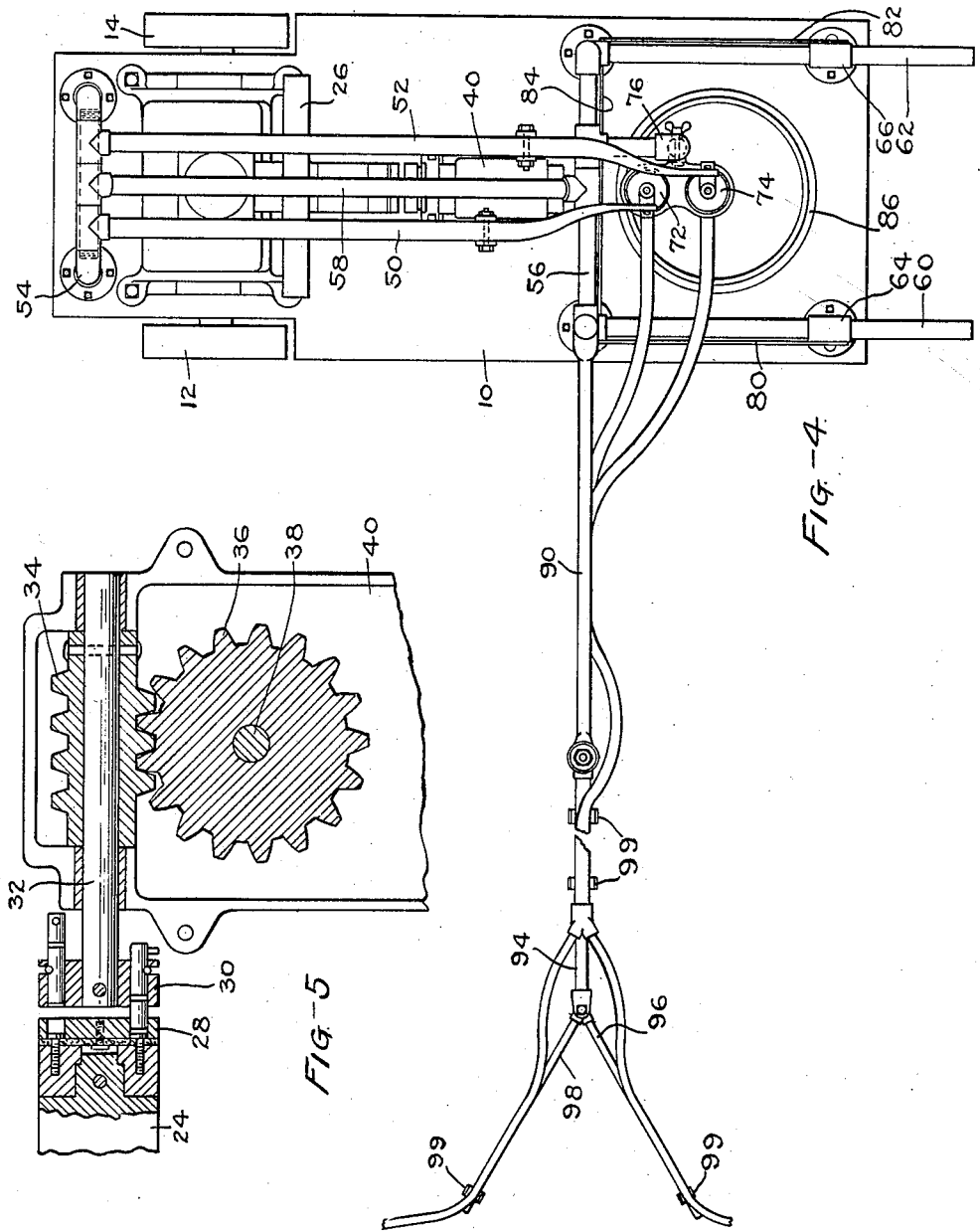

UNITED STATES PATENT OFFICE.

ALFRED EKERN, OF MINNEAPOLIS, AND RUDOLF A. TANNER, OF ST. PAUL, MINNESOTA.

PORTABLE MILKING-MACHINE.

1,377,244.   Specification of Letters Patent.   Patented May 10, 1921.

Application filed January 12, 1920. Serial No. 350,925.

*To all whom it may concern:*

Be it known that we, ALFRED EKERN and RUDOLF A. TANNER, citizens of the United States, residing at Minneapolis at St. Paul, respectively, in the counties of Hennepin and Ramsey, respectively, and State of Minnesota, have invented certain new and usefull Improvements in Portable Milking-Machines, of which the following is a specification.

Our invention relates to portable milking machines and particularly to the type of milking machine in which plungers are employed to create suction, which causes the milk to be drawn from the udder and deposited in the milk pail. An object of our invention is to provide apparatus of this character having a power plant mounted upon a truck upon which are also mounted the suction creating mechanism, the milk pail and means for supporting the hose lines leading to the milk pail so that the entire apparatus is a compact self-contained portable unit which makes it unnecessary to alter the barn or to construct special transmission lines in order to operate the apparatus.

The full objects and advantages of our invention will appear in connection with the detailed description thereof and the novel features embodied in our inventive idea will be particularly pointed out in the claims.

In the accompanying drawings, which illustrate the application of our invention in one form—

Figure 1 is a side elevational view with certain parts broken away. Fig. 2 is a front elevational view. Fig. 3 is a detail view of means for supporting the hose or milk tubes. Fig. 4 is a top plan view. Fig. 5 is a detail view mostly in section of a portion of the operating mechanism.

Referring to the construction shown in the drawings, a truck is provided which embodies a platform 10 mounted on two wheels 12 and 14 at its rear, and having a leg 16 at its front. Upon the rear of the platform is mounted a power plant 18 which is shown as a gasolene motor although it will be understood that any suitable power plant may be used. When a gasolene or similar motor is used the exhaust gases may be conducted to a muffler 20 and an exhaust pipe 22. The motor shaft 24 is provided with a fly-wheel 26 and a clutch member 28, the latter being adapted to engage a clutch member 30 secured to a shaft 32 upon which is secured a worm 34 meshing with a worm gear 36 secured to a shaft 38. The worm and worm gear are contained in a housing 40 provided with bearings for the shafts 32 and 38 and this housing is secured to platform 10. Secured to the two ends of the worm gear shaft 38 are crank arms 42 and 44 connected to pitman rods 46 and 48 having their upper ends connected to walking beams 50 and 52 which at their rear ends are oscillatingly mounted upon a frame 54 secured to the platform. A frame 56 is secured to the platform and a strut or brace rod 58 is placed between frames 54 and 56. Attached to the two upright members of the frame 56 intermediate their ends are two forwardly-extending members 60 and 62 secured to the upper ends of two vertical members 64 and 66 extending upwardly from the platform. The free forward ends of the members 60 and 62 constitute handles for pushing the truck. Attached to the forward ends of the walking beams 50 and 52 are plunger rods 68 and 70 which operate plungers in cylinders 72 and 74 which are secured to an upright member 76 attached to the frame. The cylinders at their lower ends are provided with a discharge nozzle 78. A sheet metal casing having sides 80 and 82 and a back 84 forms a protected place for a milk pail 86. In Fig. 1 the side 80 is partly broken away to show the pail and its handle 88. Hinged to one of the vertical members of the frame 56 is an outrigger which consists of two arms 90 and 92, the outer ends of which converge and have hinged thereto an arm 94. Hinged to the outer end of the arm 94 by spring hinges 95 are two arms 96 and 98 normally held to form an extension of the arm 94 by the spring hinges but capable of being swung in a horizontal plane according to the position of the cows during the milking operation. Each of the arms 96 and 98 is adapted to support the hose or flexible tubes connected with the four teat cups used for each cow, and these flexible tubes are held to the arms of the outrigger by clips 99 and are connected to the bottom portion of the cylinders 72 and 74 in the customary manner. The arm 90 may have a hook 91 attached thereto for holding the flexible tubes. By means of the outrigger described the flexible tubes are supported above the floor or ground and a wide range of positions is permitted on account of the hinge connections, which also permit the outrigger to be folded up close to the truck so as to be out of the way. An electric lamp 100 is shown attached to the frame 56 for the purpose of providing a safe light. This lamp may be illuminated by current from the magneto of the gasolene motor when a motor of this type is used.

The operation and advantages of our invention will be apparent from the foregoing description. The pistons in the cylinders 72 and 74 are alternately raised and lowered, thereby creating suction which draws the milk through the flexible tubes and causes it to flow through the nozzle 78 into the milk pail placed underneath. This operation is continued until the cow or cows at one station have been milked dry, whereupon the outrigger may be folded up and the truck may be readily moved to another station for repeating the milking operation.

We claim:

1. A milking apparatus comprising a truck, a motor mounted on said truck, a shaft driven from said motor, a worm secured to said shaft, a worm gear with which said worm meshes, crank arms secured to the shaft of said worm gear, pitman rods connected to said crank arms, walking beams to which said pitman rods are connected, plunger rods connected to said walking beams, and a milking device mounted on said truck, said milking device including plungers operated by said plunger rods.

2. A milking apparatus comprising a truck, a motor mounted on said truck, a milking device mounted on said truck, operating connections between said motor and said milking device, and an outrigger hingedly supported on said truck, said outrigger being adapted to support hose lines leading to said milking device.

3. A milking apparatus comprising a truck, a motor mounted on said truck, a milking device mounted on said truck, operating connections between said motor and said milking device, an outrigger hingedly supported on said truck, and arms attached to the outer end of said outrigger by spring hinges, said outrigger and said arms being adapted to support hose lines leading to said milking device.

4. A milking device comprising a truck, a motor mounted on said truck, a frame mounted on said truck, walking beams pivotally supported by said frame, operating connections between said motor and said walking beams, a second frame mounted on said truck, cylinders supported upon said second frame, plungers in said cylinders, plunger rods connecting said plungers and said walking beams, and flexible tubes leading to said cylinders.

In testimony whereof we hereunto affix our signatures.

ALFRED EKERN.
RUDOLF A. TANNER.